Oct. 6, 1953

J. J. SVOBODA 2,654,515

BOAT RACK FOR AUTOMOBILES

Filed May 26, 1949

INVENTOR.
Joseph J. Svoboda
BY Paul Blven

ATTORNEY

Patented Oct. 6, 1953

2,654,515

UNITED STATES PATENT OFFICE 2,654,515

BOAT RACK FOR AUTOMOBILES

Joseph J. Svoboda, Niles, Calif.

Application May 26, 1949, Serial No. 95,521

3 Claims. (Cl. 224—42.1)

1

The present invention relates to a boat rack for automobiles.

There have been made many types of racks for holding objects on the top of automobiles, and there have been many such racks particularly suited for the support of boats. Many of these prior art racks have been general purpose racks, that is, racks suited for the carrying of miscellaneous objects such as baggage, camping equipment, lumber, etc. General purpose racks are usually much more complicated and heavier than special purpose ones. Many of the prior art racks involve the use of linkages and counterweighting springs so that the rack may be loaded at a low level and then easily moved with its contents to the top of the automobile.

In the present device, applicant has sought to devise a rack specially adapted to a small boat and, yet, a rack that would make it easy for the boat to be elevated onto an automobile top. Thus, an object of the present invention is the development of an automobile boat rack that is a special purpose rack, that is light in weight, that is easily installed, and which will aid in the raising of a boat to an automobile top.

Many of the defects of the prior art devices are remedied and the above objects are achieved by the construction of a device in which there is provided a single track, or rail, that extends from a point low down in back of an automobile to a point well forward of the top thereof. The length of the track depends somewhat upon the length of the boat. The track may be supported on two or more cross bars which in turn are supported on rubber cups placed in contact with the automobile top. A roller to fit this track is secured near the bow of the boat to be carried, and the boat is placed on the top by placing the roller on the back end of the track and lifting the stern of the boat and pushing the roller and boat up and along the track.

Such a construction is shown in detail in the accompanying drawings, in which.

2

Figure 1:
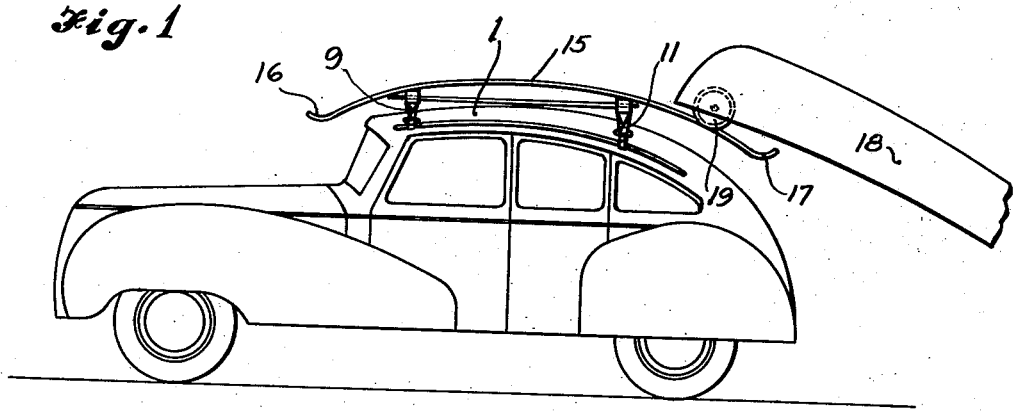
Figure 1 is an elevational view of an automobile with my invention in place thereon, and a boat about to be elevated to the top thereof.
Figure 2:
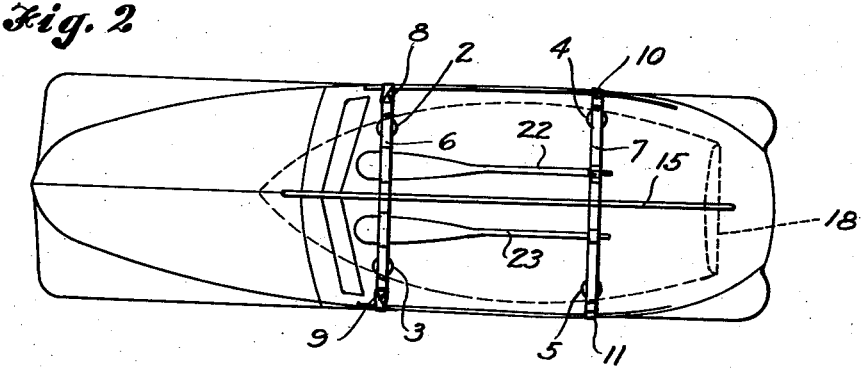
Figure 2 is a plan view of Figure 1 with a boat shown in dotted lines on top of the automobile and on the rack.
Figure 4:
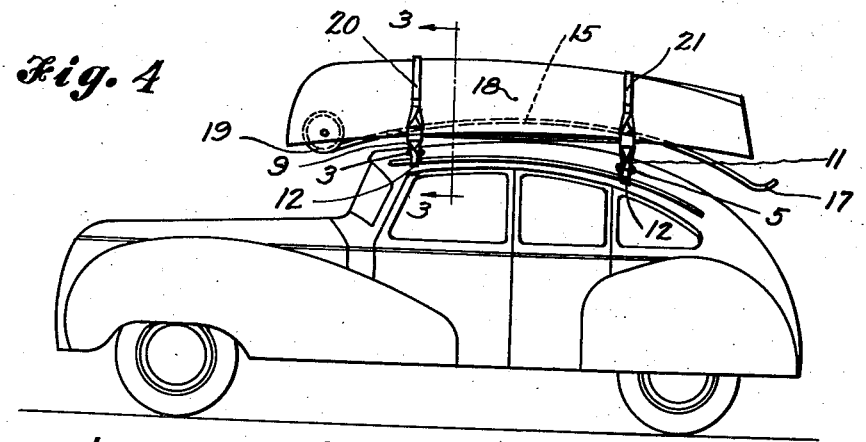
Figure 4 is another elevation view similar to Figure 1 but with the boat shown on top of the automobile and rack.
Figure 3:
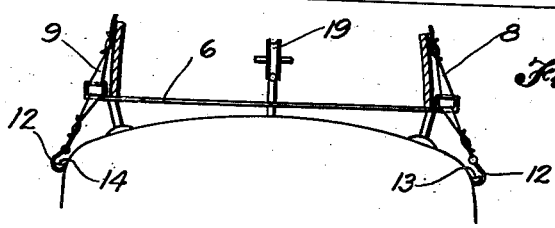
Figure 3 is partial sectional view on the line 3—3 of Figure 4.

In the drawings there is shown an automobile having a top 1. In contact with the top are a series of rubber cups 2, 3, 4, 5 that support two cross bars 6, 7. Each cross bar has each end thereof secured to the top 1 by an adjustable strap 8, 9, 10, 11 and hook 12 that hooks under the gutter strip 13, 14 at the side edge of the top 1. Most automobile tops are provided with such gutter strips. By such means, the cross bars are securely fastened to the top.

Secured to, above, and extending between each cross bar is a round rod 15, or rail. This rail is humped and extends downwardly in back of the top, and forwardly and somewhat downwardly in front of the top. Near each end of the rail there is an inflection point followed by a hook, or an upturned end portion 16, 17. The section of the rail between the end hooks may be curved to conform to the curve of the top.

The boat 18 to be placed on the rack is provided near its bow with a roller 19 secured to the boat. The roller has a grooved face to conform to the rail 15, and when secured in the bow of the boat, projects above the gunwales thereof. Straps 20, 21 are provided for securing the boat to the rack when the boat is in position thereon. Also, clips and sockets may be provided on the cross bars whereby boat paddles 22, 23 may be secured to the rack and carried therewith.

In the actual construction of the rack, the rail may be secured to the cross bars in such manner as to be easily separated therefrom so that the rack may be stored and shipped in a small package.

To make the rack ready for use, the cross bars 6, 7 are placed on the top 1 with their rubber cups 2, 3, 4, 5 in contact with the top. The bars 6, 7 are tightened down on the top by placing the hooks 12 under the gutters 13, 14 and tightening the straps 8, 9, 10, 11. The round bar 15, or rail, is then secured to the cross bars 6, 7 with one end extending downwardly in back of the top 1. The boat paddles, or oars, 22, 23 may then be placed in their clips and sockets on the cross bars to secure them to the rack. The roller 19 is secured in the bow of the boat to project above the gunwales, and the roller is placed in the hook 17 at the back lower end of the rail 15. The lower this hook is with respect to the ground upon which the automobile rests, the less direct lifting there need be of the boat. Once the roller 19 is on the track the stern of the boat may be lifted and the roller 19 and the boat 18 moved along the rail 15. The hook 17 prevents the accidental slipping of the roller off the end of the rail and onto the top with probable damage to the top.

As the roller 19 passes up and over the hump of the rail and approaches the front end of the rail 15, the downward curvature of the rail brings the boat downward until the gunwale of the boat rests on the front cross bar 6. The front hook 16 prevents the boat running too far forward. With the bow of the boat in position and the gunwales of the boat in contact with the front cross bar 6, the after end of the boat is lowered so that the after portions of the gunwales rest on the rear cross bar 7. The straps 20, 21 may then be placed and secured to hold the boat on the rack. In this position the automobile carrying the rack and boat may be driven at high speed without possible loss of the boat.

Various lengths of rail may be provided for various length boats, and the dimensions of the cross bars and rubber cups may be changed to adapt the rack to different automobiles. It should be observed that it is the hump, or curve, of the rail that allows the boat gunwales to rest on the cross bars.

Having thus described my invention, I claim:

1. A boat rack adapted to be secured to the top of an automobile, and when in position on such a top, having the following form and comprising: a pair of spaced apart cross bars, means for securing such bars on and to such top, a rail adapted to be placed medially of and longitudinally of such top, means for securing said rail to the middle upper side of each of said bars, such rail being curved over such top from a position low and in back of such top to a position below and in front of such top, and the ends of said rail being formed with reversed curves with respect to the rest of said rail.

2. A boat rack adapted to be secured to the top of an automobile and when in position on such a top, having the following form and comprising: a pair of spaced apart cross bars, means for securing said bars on and to such a top, a rail adapted to be placed medially of and longitudinally of such top, means for securing said rail to the middle upper side of each of said bars, said rail being humped over such top from a position low and in back of such top to a position below and in front of such top, and an end of said rail being formed with a reversed curve forming a hook with respect to the rest of said rail.

3. A boat rack adapted to be secured to the top of an automobile, and when in position on such a top, having the following form and comprising: a pair of spaced apart cross bars, means for securing said bars on and to such top, a rail adapted to be placed medially of and longitudinally of such top, means for securing said rail to the middle upper side of each of said bars, said rail being humped over such top from a position low and in back of such top to a position below and in front of such top, and the ends of said rail being formed with reversed curves forming hooks with respect to the rest of said rail.

JOSEPH J. SVOBODA.

References Cited in the file of this patent

UNITED STATES PATENTS

| Number | Name | Date |
|---|---|---|
| 1,350,644 | Dove | Aug. 24, 1920 |
| 1,894,534 | Dolan | Jan. 17, 1933 |
| 2,009,149 | Pierce | July 23, 1935 |
| 2,022,375 | Judd | Nov. 26, 1935 |
| 2,096,455 | Francis | Oct. 19, 1937 |
| 2,247,128 | Levey | June 24, 1941 |
| 2,361,592 | Bjork | Oct. 31, 1944 |
| 2,412,162 | Lindblom | Dec. 3, 1946 |
| 2,446,092 | Lait | July 27, 1948 |